Dec. 13, 1966  R. L. WATTERS  3,292,064
FREQUENCY REGULATED CHRONOMETER
Filed March 16, 1964  3 Sheets-Sheet 1
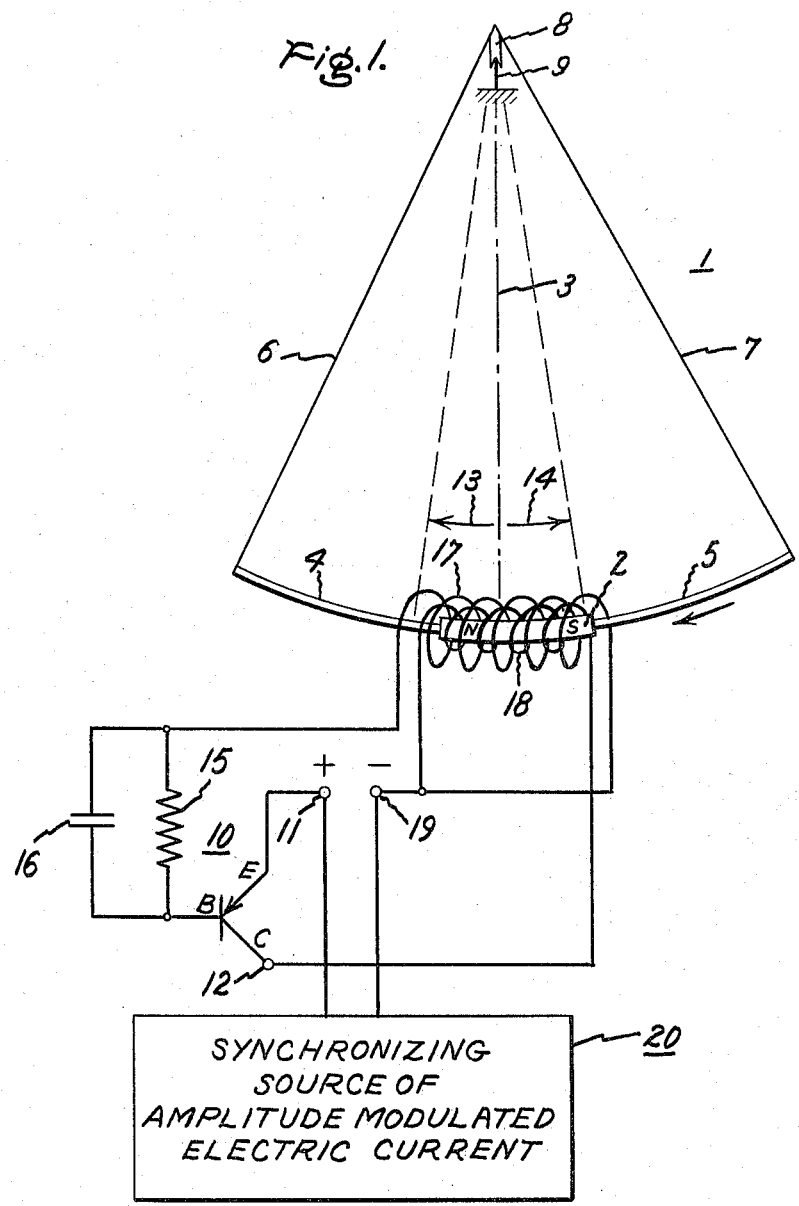
Inventor:
Robert L. Watters,
by Richard R. Brainard
His Attorney.

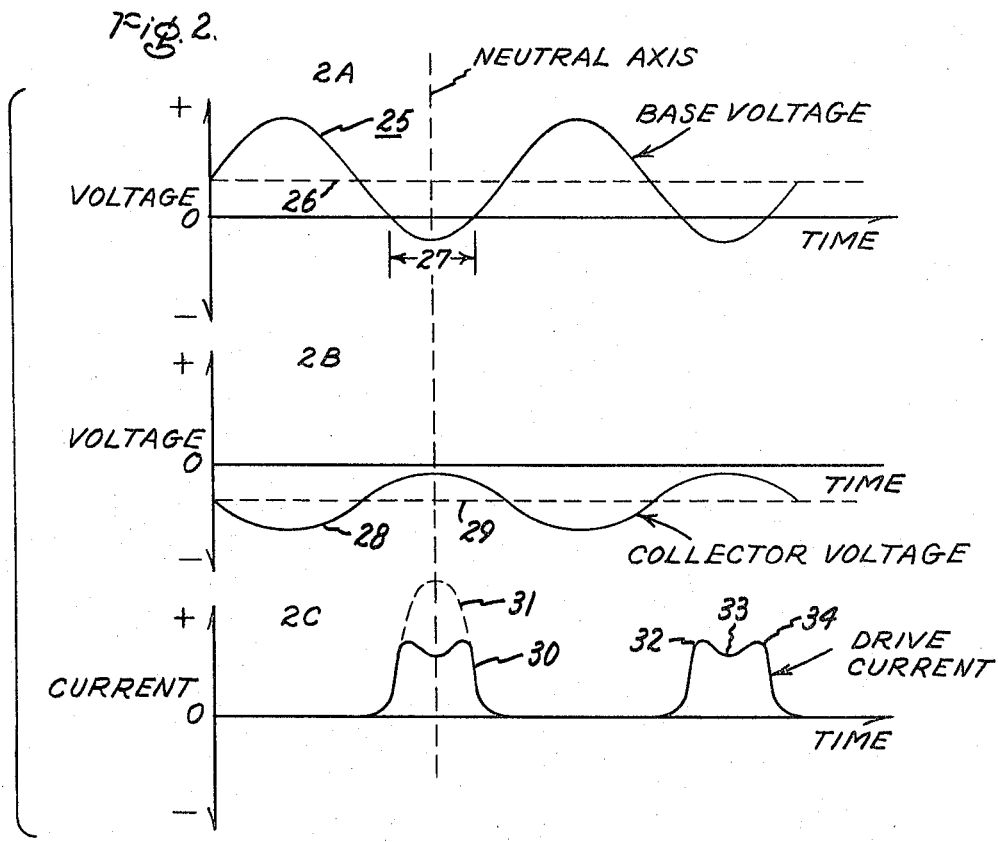
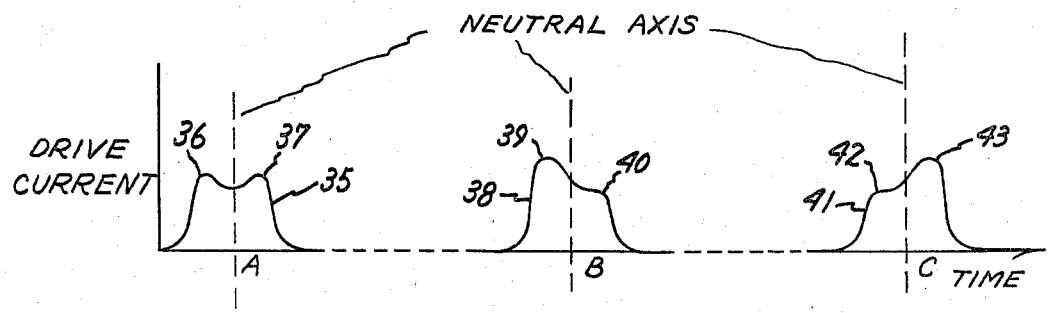

United States Patent Office 3,292,064
Patented Dec. 13, 1966

3,292,064
FREQUENCY REGULATED CHRONOMETER
Robert L. Watters, Schenectady, N.Y., assignor to General Electric Company, a corporation of New York
Filed Mar. 16, 1964, Ser. No. 352,087
3 Claims. (Cl. 318—127)

The present invention relates generally to mechanical resonant systems that are synchronized to an electrical signal, and more particularly relates to a chronometer having an accuracy equal to that of a low power, precisely controlled, source of radio frequency.

It is oftentimes essential, or highly desirable, to provide a mechanical resonant system synchronized with the frequency of an electrical signal. Because such systems normally only permit an increase in the rate of oscillation of the mechanical element, it has been required heretofore that the natural resonant frequency of the mechanical element always be less than that of the source of synchronizing signals. In order to ensure the latter relationship, more synchronizing power is required than if the mechanical resonant frequency and frequency of the electric signal source were initially selected to be substantially equal and deviations in either direction were correctable by absorbing power from the source of synchronizing signals to restore synchronism.

In applications where the mechanical resonant system is remote from the source of electrical synchronizing signal, particularly when the latter is to be broadcast by electromagnetic radiation, it is highly desirable to minimize the synchronizing power required. Ideally, the mechanical resonant system should possess a high "Q" (i.e., have relatively little energy loss) and the natural resonant frequency should be substantially equal to that which is desired. The synchronizing signal then need supply only sufficient energy to provide a relatively small correction to accelerate or decelerate the mechanical system to conform exactly with the frequency of the signal source.

Accordingly, it is an object of my invention to provide a system wherein a mechanical resonant system is synchronized to the frequency of a relatively low power electric signal.

Another object of my invention is to provide a system wherein a mechanical resonant system has a frequency of oscillation that is increased or decreased to conform with the frequency of a low power source of electric signal.

Still another object of my invention is to provide a chronometer that is accurately synchronized to the frequency of a precisely controlled electric signal source.

Briefly stated, in one embodiment of my invention there is a high Q mechanical resonant system including an element adapted to move about a neutral position with periodic motion of predetermined frequency in response to temporary displacement of the element from the neutral position. A driving coil is electromagnetically coupled to the element along substantially equal paths disposed symmetrically about the neutral, or "dead-center," position of the mechanical element. A transistor and a sensing coil combine to energize the driving coil from a source of electrical energy when the element passes through the neutral position. The voltage induced in the driving coil is sufficient to cause the transistor to operate in a collector-saturated mode when the movable element is in the vicinity of the neutral axis. The driving coil attracts the element, causing it to accelerate during transition of the element up to the neutral point and thereafter the element is braked, or decelerated, until the switching means de-energizes the driving coil. The source of energy for the driving coil is amplitude modulated with a frequency that is a harmonic of the natural resonant frequency of the element. The mechanical element receives stronger braking when its natural resonant frequency is higher than that of the synchronizing source and receives greater acceleration when its natural resonant frequency is below that of the synchronizing frequency, to provide a correction that ensures exact synchronism with the source of synchronizing signal.

The features of my invention which I believe to be novel are set forth with particularity in the appended claims. My invention, however, both as to its organization and method of operation, together with further objects and advantages thereof, may best be understood by reference to the following description taken in connection with the accompanying drawing in which:

FIGURE 1 is a schematic representation of a mechanical resonant system and drive circuit suitable for use in accord with the present invention;

FIGURE 2 illustrates typical voltage and current waveforms present in the drive circuit of FIGURE 1;

FIGURE 3 is a graph of driving current versus time for varying conditions in the system of FIGURE 1; and, FIGURE 4 is a schematic circuit diagram of a source of electric signals suitable for use in accord with my invention.

Figure 4:
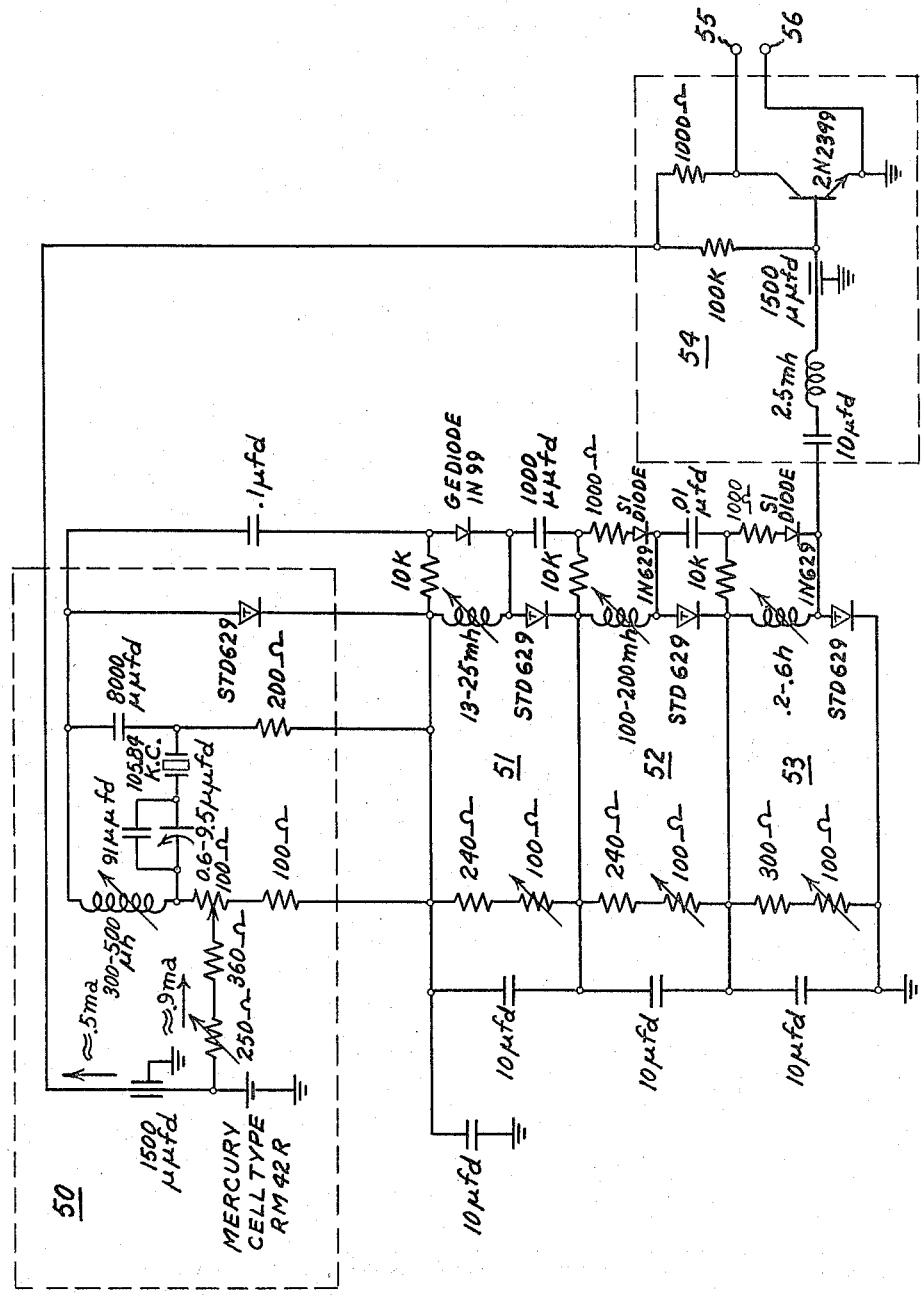

In the schematic representation of FIGURE 1 a high Q mechanical resonant system, generally shown at 1, includes an element 2 adapted to move about a neutral position, or "dead-center," defined by neutral axis 3, with periodic motion of predetermined frequency in response to temporary displacement of element 2 from neutral axis 3. By "high Q" it is meant that losses in the mechanical resonant system are small, resulting in a large number of cycles of periodic motion for element 2 in response to temporary displacement thereof. In other words, there is very little friction or other mechanical damping forces tending to oppose motion of element 2.

The mechanical resonant system of FIGURE 1 takes the form of a pendulum wherein element 2 is pendulously supported by solid structural members 4 and 5 that are connected to tension-sustaining members 6 and 7, respectively. Members 6 and 7 are in turn supported by an assembly 8 that is balanced on a knife edge 9 as shown, or other low friction bearing means. While a pendulum assembly has been selected for purposes of more clearly and simply describing the invention, the present invention is in no way limited thereto and equally contemplates other high Q mechanical resonant systems, for example, vibrating systems, as tuning forks, and oscillating systems, as torsional balance wheels.

Regardless of the particular mechanical resonant system selected, it is desirable, though not essential, that the moveable element be subjected to a restoring force that increases in direct proportion to displacement from a neutral position in order to provide substantially simple harmonic motion. This is achieved with the system of FIGURE 1, for example, by limiting the amplitude of oscillation of element 2 to a small fraction of the length of members 6 and 7. Element 2 is advantageously selected to be a permanently magnetized body, as the bar magnet illustrated in FIGURE 1. In this way electromagnetic coupling to a sensing and driving circuit, to be described presently, is facilitated.

Switching means 10 is coupled to element 2 and is responsive to the movement of element 2 to provide an electrically conductive path between terminals 11 and 12, of switching means 10, only when element 2 moves in one predetermined direction through first and second portions 13 and 14, respectively, of its path. The switching means can take the form of a transistor, as shown, having its base-emitter circuit connected by suitable means, as by parallel connected resistor 15 and capacitor 16, to a sensing coil 17 that is substantially coextensive with portions 13 and 14 of the path of element 2.

Terminals 11 and 12 of switching means 10 form part of a series loop network that includes a synchronizing source, generally shown at 20, of amplitude modulated electric current and a driving coil 18 that is coupled to element 2 at least during its transition through portions 13 and 14 of its path of movement. One terminal of synchronizing source 20 is connected to terminal 11 of switching means 10 and the other terminal of source 20 is connected to terminal 19, which is, in turn, connected to extremities of both sensing coil 17 and driving coil 18.

In the interest of readily gaining an understanding of the operation of the synchronized system of FIGURE 1, assume initially that synchronizing source 20 is a battery that causes terminal 11 to assume a positive potential with respect to terminal 19. Connection of a voltage source in this polarity ensures conduction between terminals 11 and 12, of switching means 10, in a manner well-known to those skilled in the art, because the base-emitter junction is forward-biased and the base-collector junction is properly reverse-biased. Oscillation of element 2 commences, owing to electrical and mechanical asymmetries, and a periodic electric voltage is induced in sensing winding 17 and driving winding 18 as the magnetized element 2 swings back and forth relative thereto. The voltage induced in winding 17 is used to sense the position of element 2 and the voltage induced in winding 18 can be considered as a counterelectromotive force, all as will be described presently in conjunction with the voltage and current waveforms illustrated in FIGURE 2.

FIGURES 2A and 2B illustrate the voltage waveforms of the base and collector voltages, respectively, of the transistor that is switching means 10 in FIGURE 1, taken during normal operation of the oscillator and with reference to the emitter. The voltage waveform 25 of the base varies periodically about a positive voltage level, shown as horizontal dashed line 26. This voltage level is equal to the voltage accumulated by capacitor 16 and is approximately equal, in most cases, to the magnitude of voltage supplied between terminals 11 and 19. The voltage across capacitor 16 is sustained during conduction of the transistor in a manner that those skilled in the art will recognize as comparable in some aspects to a grid leak bias oftentimes used in the vacuum tube art.

In the interest of maintaining the voltage level substantially constant during a period of operation, the time constant, or product of the resistance value in ohms of resistor 15 and capacitance value in farads of capacitor 16, is advantageously selected to be long with respect to the period of the mechanical element. When economy or size of components is a primary consideration, a substantial decay of the voltage level is tolerated during a period of oscillation if the amplitude of voltage induced in sensing winding 17 is correspondingly reduced.

The switching means is enabled, or rendered conductive, when element 2 moves in one predetermined direction through first and second portions of its path that are disposed substantially symmetrically about and extend in opposite directions, respectively, from the neutral axis 3. This is achieved because element 2 travels at maximum velocity relative to coil 17 in the vicinity of axis 3 and hence induces maximum voltage in coil 17 during this portion of its cycle. The induced voltage is negative during a swing in one direction and reverses polarity during the return swing in the opposite direction. With the circuit of FIGURE 1, the switching means is rendered conductive during the negative alternation of the voltage induced in sensing winding 17. This is because the PNP transistor shown has base is conductive only when the base is negative, relative to the emitter, or during that portion of the cycle falling within time 27, for example, of FIGURE 2A.

There has been thus far described an electromechanical oscillator suitable for a large number of purposes. The moveable element is accelerated toward the neutral axis for a first increment of time and thereafter decelerated for a second increment of time, after having passed the neutral axis. By suitable adjustment of the time increments, voltage supplied, or both, to supply sufficiently more acceleration than deceleration such that losses are supplied, the moveable element oscillates in a sustained manner. However, such a device, without more, is not readily synchronized because the slightest change in the waveform of the current in driving winding 18 upsets the delicate balance required to barely supply energy equal to the losses of the oscillating mechanical system. The result is that the amplitude of oscillations either increases to an undesirable, accuracy-destroying, extent or decreases to zero, depending upon whether the synchronizing signal is attempting to decrease or increase the period of oscillations, respectively.

Even though the last-mentioned problem can be solved, as by means to provide constant amplitude oscillations, synchronization of electro-mechanical systems of the type thus far described is additionally rendered inexact because the amount of correction that can be applied is very limited before the mechanical element begins to slip out of synchronization. This difficulty is particularly pronounced with high Q systems, that are of principal concern in connection with the present invention. One reason for the noted undesirable behavior is that the pendulum-energizing pulse is supplied to the driving winding with maximum amplitude when the pendulum is at or near the neutral axis, at which time the pulse is least effective.

The oscillations are stabilized when the electrical driving pulse is characterized by two current maxima occurring at substantially equal distances from the neutral axis, where great influence on the movement of element 2 is obtained. This is achieved by selecting the amplitude of the alternating voltage induced in driving coil 18 to be approximately equal to, and preferably only slightly less than (e.g., 10% less than), the magnitude of the voltage applied between terminals 11 and 19 of FIGURE 1, during normal operation. The minimum voltage difference, during normal operation, is advantageously selected to be about 0.1 volt or about 0.3 volt when switching means 10 is a germanium or silicon transistor, respectively. When the aforementioned relationship is established, the collector voltage waveform 28, of FIGURE 2B, obtains. Dashed line 29 illustrates the applied unidirectional voltage between terminals 11 and 19. The unidirectional voltage is required to be present only during interval 27, of FIGURE 2A, since the switching means is conductive during only this portion of the cycle.

When the moveable element is in the vicinity of the neutral axis, the back E.M.F., or voltage induced in winding 18, is approximately equal to the applied voltage and the net collector voltage approaches zero. Hence, the transistor of FIGURE 1 is in the collector-saturation region during this interval, at which time the base electrode surrenders control of current through the device to the collector. This produces the current waveform 30 of FIGURE 2C, having two maxima separated by a minimum, or valley, at the neutral axis, rather than the waveform 31 that is peaked at the neutral axis, and illustrated by a dashed line.

The magnetic field provided by winding 18 is proportional to the magnitude of current through the winding, as shown by waveform 30. The first maximum, or hump, 32 occurs prior to the neutral axis, or dead-center, and accelerates the moveable element toward the neutral axis. Current in coil 18 during the minimum, or valley, portion 33, of waveform 30 occurs when the moveable element is at or adjacent the neutral axis and has comparatively little effect on movement of the element. The second maximum, 34, occurs after the neutral axis crossing, and provides a force in the direction to return the moveable element to the neutral axis and, consequently, decelerates, or brakes, the moveable element.

An increase in the velocity of the moveable element, increases the counter E.M.F. induced in winding 18 and decreases the average magnitude of the current supplied to winding 18, thus restoring the system to dynamic equilibrium. Similarly, a decrease in velocity provides an increase in current that restores equilibrium. In this way, the amplitude of mechanical oscillation is kept substantially constant.

I have discovered that electromechanical oscillators, of the type described above, are readily synchronized to an external signal. This signal is produced by synchronizing source 20, which is now considered to replace the battery previously assumed, for simplicity, to be connected across terminals 11 and 19. This is true even though the Q of the mechanical portion of the system is large enough to provide an accuracy of timekeeping with an error of one part in ten thousand, or within 50 minutes per year. The source of synchronizing signal can range from a source of square-waves, having an amplitude equal to the normal battery voltage of the electromechanical oscillator, to a small periodic voltage superimposed upon, or modulating, the normal battery voltage.

Because the duty cycle of electromechanical oscillators of the type described above is not large, the frequency of the synchronizing voltage can be approximately equal to the third harmonic of the natural resonant frequency of the mechanical element and the ninth harmonic has been found satisfactory when the frequency deviation to be corrected is not large. The latter is a particularly advantageous selection when the standard synchronizing signal is a radio frequency because one frequency divider is oftentimes obviated by so doing. The term "harmonic" as used herein and in the appended claims includes the fundamental harmonic, as well as the second and higher order harmonics.

FIGURE 3 illustrates the drive current waveform of the electromechanical oscillator as described above when synchronized with a source of rectangular-wave pulses having a frequency substantially equal to the natural resonant frequency of the oscillating mechanical element. Waveform 35 of FIGURE 3A illustrates the drive current waveform when the frequency of the source of synchronizing signals and the natural resonant frequency of the oscillating element are about equal. In this case, the waveform closely resembles those of FIGURE 2C and the driving and braking current humps, 36 and 37, respectively, are approximately equal in magnitude.

Waveform 38, of FIGURE 3B, occurs when the natural resonant frequency of the oscillating mechanical element is less than the frequency of the source of synchronizing signals and in this case the leading current hump 39 is larger in magnitude than the lagging current hump 40, to provide a net increase in acceleration, tending to restore synchronism. Conversely, waveform 41 of FIGURE 3C shows the drive current when the circumstances are reversed and the natural resonant frequency of the mechanical element exceeds the frequency of the source of synchronizing signals. In the latter case, leading current hump 42 is of lesser magnitude than lagging current hump 43, resulting in increased braking of the mechanical element that again restores synchronism with the source of synchronizing signals. Because the electromechanical oscillating systems to be used in accord with the present invention feature a switching means that saturates, i.e., controls the total driving effect of the source of electrical energy so that the net energy received by the mechanical element varies inversely with its amplitude, the waveforms of FIGURES 3B and 3C, that are distorted from that shown in FIGURE 3A, do not result in a significant change in amplitude of the mechanical element. Thus, stability is maintained even though a relatively large frequency correction is being applied.

FIGURE 4 is a schematic circuit diagram, with components labelled, of a specific electric signal synchronizing source suitable for use in accord with my invention. The circuit is given in complete detail in order to assist those not particularly acquainted with the electronic circuit art in the practice of my invention. It is to be understood that the present invention is in no way limited to the detailed signal source shown but extends equally well to a plurality of other suitable sources that will suggest themselves to those skilled in the art.

The signal source of FIGURE 4 includes a negative resistance diode oscillator 50 that is, preferably, crystal controlled and can be connected as shown. Alternatively, oscillator 50 can comprise a negative resistance diode oscillator of the type disclosed and claimed in my U.S. Patent No. 3,081,436, that is assigned to the assignee of the present invention. The oscillator output frequency is divided by a plurality of frequency-transforming circuits utilizing negative resistance devices. Frequency transforming circuits of the variety shown are disclosed and claimed in my U.S. Patent No. 3,076,944, that is assigned to the assignee of the present invention.

In the specific circuit of FIGURE 4, oscillator 50 is advantageously selected to oscillate at a frequency of 105.84 kilocycles, in which case the frequency dividers 51, 52 and 53 are conveniently selected to divide the frequency by factors 6, 7 and 7, respectively, in order to provide an output frequency of 360 cycles per second. Output stage 54 is therefore driven by a signal of 360 cycles per second which is supplied to output terminals 55 and 56. The signal source of FIGURE 4 is then substituted for source 20 of FIGURE 1 by connecting output terminals 55 and 56 to terminals 11 and 19, respectively, in the circuit of FIGURE 1. The natural resonant frequency of element 2 is, of course, selected to be substantially equal to 360 cycles per second or a suitable subharmonic thereof.

I have discovered that one particularly desirable high Q mechanical resonant system for use in accord with my invention is the chronometer manufactured by the Bulova Watch Company, Inc., under the trademark "Accutron." This mechanical resonant system fulfills the above described requirements of the mechanical system required for use in accord with my invention, including saturating switching means that provide the desirable driving current waveform for synchronizing which is described in detail above. With such a system, the terminals 11 and 19, of FIGURE 1, are the battery terminals of the chronometer. The basic accuracy of chronometers of this type is in the order of one part in $10^4$ to $10^5$, representing an error of from about 3000 to 300 seconds per year. When combined with the circuit in FIGURE 4, the accuracy is determined entirely by the accuracy of the frequency standard used, and I have obtained accuracies in the order of 5 seconds per year, using GT cut crystals in normal room environment, without a crystal oven. Additionally, synchronization has been similarly achieved by modulating a direct current source having a voltage in the order of 1.34 volts, with an alternating current signal providing in the order of 10 percent modulation. Thus, a relatively small power source of synchronizing voltage is required.

While only certain preferred features of my invention have been shown by way of illustration, many modifications and changes will occur to those skilled in the art. For example, other voltage-saturable switching means can be used, as magnetic elements. It is, therefore, to be understood that the appended claims are intended to cover this and all such other modifications and changes as fall within the true spirit and scope of my invention.

What I claim as new and desire to secure from Letters Patent of the United States is:

1. A synchronized mechanical oscillator system comprising: a high Q mechanical resonant system including a magnetized element adapted to move about a neutral position with periodic motion of predetermined frequency in response to temporary displacement of said element from the neutral position; switching means coupled to said element and responsive to the movement thereof to provide an electrically conductive path between at least two terminals of said switching means only when said element moves in one predetermined direction through first and second portions of its path that are substantially equal in length and extend in opposite directions, respectively, from said neutral position; electromagnetic means located adjacent the path of said element and adapted to influence said predetermined frequency by accelerating said element during passage of said element through said first portion of the path and decelerating said element during passage of said element through said second portion of the path respectively in response to amplitude peaks of unidirectional electric current pulses having two maxima separated by a minimum; a source of amplitude modulated periodic electric current having a frequency that is substantially equal to a harmonic of said predetermined frequency; and means operatively connecting said two terminals of said switching means, said electromagnetic means and said source in series circuit relationship to apply said periodic current to said switching means so as to increase amplitude of one of said pulse maxima and decrease amplitude of the other of said pulse maxima in response to asynchronization of the movements of said element with the frequency of said source.

2. The oscillator system of claim 1 wherein said electromagnetic means comprises a coil having a number of turns selected so that said magnetized element induces a counter-voltage in said electromagnetic means that is approximately equal in magnitude to the magnitude of voltage supplied by said source at least during the intervals when said element is in the vicinity of the neutral position.

3. The oscillator system of claim 2 wherein said switching means comprises a transistor that operates in its collector-saturation region when said element is in the vicinity of the neutral position and moving in said predetermined direction.

References Cited by the Examiner

UNITED STATES PATENTS

| | | | |
|---|---|---|---|
| 2,945,997 | 7/1960 | Kennedy | 318—171 X |
| 2,960,817 | 11/1960 | Hetzel | 318—128 X |
| 2,974,265 | 3/1961 | Thoma | 318—132 |
| 2,976,470 | 3/1961 | Krassoievitch et al. | 318—341 |
| 3,076,944 | 2/1963 | Watters | 307—88.5 X |
| 3,081,436 | 3/1963 | Watters | 307—88.5 X |
| 3,168,690 | 2/1965 | Lavet et al. | 318—127 |
| 3,212,252 | 10/1965 | Nakai | 318—129 X |

MILTON O. HIRSHFIELD, *Primary Examiner.*

D. F. DUGGAN, *Assistant Examiner.*